(12) United States Patent
Güttinger

(10) Patent No.: US 7,888,595 B2
(45) Date of Patent: Feb. 15, 2011

(54) HOUSING FOR AN ELECTRIC APPLIANCE

(75) Inventor: Marc Güttinger, Herbrechtingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 518 days.

(21) Appl. No.: 11/918,501

(22) PCT Filed: Mar. 31, 2006

(86) PCT No.: PCT/EP2006/061234

§ 371 (c)(1),
(2), (4) Date: Oct. 10, 2007

(87) PCT Pub. No.: WO2006/120081

PCT Pub. Date: Nov. 16, 2006

(65) Prior Publication Data

US 2009/0065232 A1 Mar. 12, 2009

(30) Foreign Application Priority Data

May 10, 2005 (DE) .................. 20 2005 007 418 U

(51) Int. Cl.
*H02G 3/08* (2006.01)

(52) U.S. Cl. ............................. 174/50; 174/53; 174/58; 174/60; 248/906; 439/535

(58) Field of Classification Search .................... 174/50, 174/53, 58, 60, 51; 220/3.8, 3.6, 4.02; 439/535; 248/906
See application file for complete search history.

(56) References Cited

U.S. PATENT DOCUMENTS

| | | | | |
|---|---|---|---|---|
| 3,876,821 A | * | 4/1975 | Pringle .......................... | 174/53 |
| 4,960,964 A | * | 10/1990 | Schnell et al. ................. | 174/51 |
| 4,993,575 A | * | 2/1991 | Maes ............................ | 220/3.8 |
| 5,608,611 A | * | 3/1997 | Szudarek et al. ............. | 361/753 |

FOREIGN PATENT DOCUMENTS

| | | |
|---|---|---|
| DE | 43 40 334 | 8/1994 |
| DE | 199 53 834 | 5/2001 |

OTHER PUBLICATIONS

International Search Report PCT/DE2006/061234.

\* cited by examiner

*Primary Examiner*—Dhiru R Patel
(74) *Attorney, Agent, or Firm*—James E. Howard; Andre Pallapies

(57) ABSTRACT

A housing for an electric appliance includes a wall with an electrically insulating solid structure, an electrically conductive skin that is fastened to the solid structure, an electrically conductive support, and at least one screw that engages into a bore of the structure and keeps the support pressed against the wall. The screw extends through a recess of the electrically conductive skin. Material of the electrically conductive skin that surrounds the recess is displaced by the screw.

8 Claims, 2 Drawing Sheets

HOUSING FOR AN ELECTRIC APPLIANCE

BACKGROUND OF THE INVENTION

The present invention relates to a housing for an electric appliance and especially to the grounding of components of this housing. To ensure that electrical appliances can be operated safely, metal parts which can be touched by a user and which conduct voltage while the appliance is operating or for which there is the possibility of them being able to conduct a voltage as a result of a fault, must be grounded. For blank metal parts this can be done by pressing the parts, e.g. screwing them firmly onto a grounding conductor. Such a grounding conductor can for example be a wire connected to ground potential of an ac mains power socket or any electrically-conductive part of the housing which is connected directly or indirectly electrically-conductively to such a wire.

With metal parts which are enameled or coated in some other way to make them electrically insulated such press contact is not sufficient to reliably establish a conductive connection.

To establish a reliable conductive contact to an enameled panel or one which is coated to provide some other form of electrical insulation, a screw with a sharp-edged profile can be used which, inserted into a hole in this panel, cuts its own thread in the hole and in doing so penetrates the insulating coating. It is difficult however to achieve the required operational safety with such a connection, since, to enable the screw to cut the thread, without a disproportionate torque having to be exerted on it, the panel must be quite soft or quite thin, with the result that only a slight load can be imposed on the connection made by the screw.

BRIEF SUMMARY OF THE INVENTION

The object of the present invention is to specify a housing for an electric appliance in which an electrically conductive connection between two metal parts is formed in a simple, reliable and yet still durable manner.

The object is achieved by a housing for an electric appliance with a wall comprising an electrically-insulating structure and an electrically-conductive skin fastened to the structure, an electrically-conductive support and at least one screw which engages in a hole in the structure and thereby keeps the wall pressed against the support, with the screw extending through a recess of the skin and the material of the skin surrounding the recess being displaced by the screw.

The material displacement causes the screw to establish a secure electrical contact to the conductive skin; by simultaneously engaging in the hole in the solid structure it establishes a secure grip there so that the electrical contact between the screw and the conductive skin is not adversely affected by forces which operate on the screw or on the wall. A reliable and durable conductive connection is thus established between the skin and the electrically-conductive support.

There are hardly any restrictions on the shape of the recess. Preferably the recess is a hole, however it can also be implemented as a notch open at the edge of the recess.

Preferably the recess has a serrated edge since the serrations can be deformed by the screw significantly more easily than an edge which for example runs essentially straight.

Preferably two serrated edges of the cutout lie opposite one another so that the screw is clamped between two serrations protruding from two sides.

The electrically-conductive skin can be the outer cover of the housing. Since the skin is fastened to the electrically-insulating fixed structure, it does not need to be self-supporting, which means that a thin and low-cost panel can be used for it.

The solid structure can be a molded part made of plastic.

If the panel is enameled, the enamel layer is preferably omitted in the immediate vicinity of the recess in order to promote conductive contact between the panel and the screw, even if the enamel layer prevents a direct electrical contact between the panel and the support.

The invention is preferably applicable to a refrigerator housing. A compressor of the refrigerator can be mounted on the support for example, so that the support can simultaneously be used for mechanical support and also for grounding of the compressor.

BRIEF DESCRIPTION OF THE DRAWINGS

Further features and advantages of the invention emerge from the description of an exemplary embodiment given below with reference to the enclosed figures. The figures show.

DETAILED DESCRIPTION OF EXEMPLARY EMBODIMENTS OF THE PRESENT INVENTION

Figure 1:
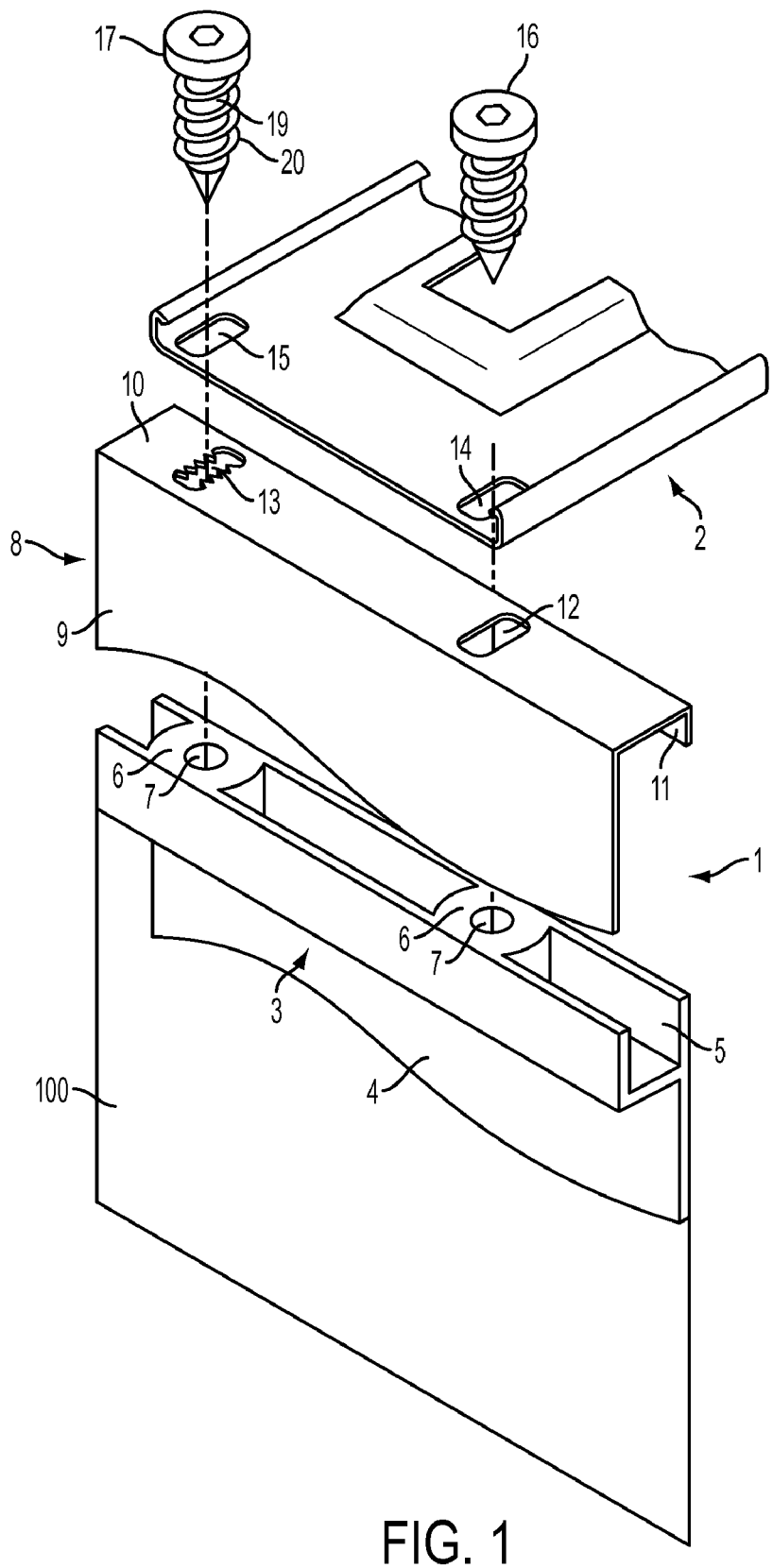
FIG. 1 an exploded perspective part view of an inventive housing

FIG. 1 shows a perspective exploded view of a housing 100 of a refrigerator including a connection between a housing wall 1 of the refrigerator and a support rail 2 which is provided as a support for a compressor (not shown) of the refrigerator.

The housing wall 1 shown in section comprises an inner part 3 made of plastic and an outer part 8 formed from enameled metal. The inner part 3 comprises a plate 4, which forms an inner side of the housing wall and at the free edge of which a U-profile 5 is formed. Molded into the groove of the U profile 5 in the perspective view shown in FIG. 1 are a number of massive plastic blocks 6 which join the opposite legs of the U profile 5 to each other and in which a pocket hole 7 is formed in each case.

The outer part 8 of the housing wall 1 comprises a plate 9 running in parallel to wall plate 4 of the inner part 3 as well as a first bar 10 bent at right angles and a second bar 11 angled from the edge of the first bar 10 in parallel to plate 9. When the parts are assembled the first bar 10 covers the groove of the U-profile 5, and the plate 9 and the outside of the second bar 11 lies against the legs of the U-profile 5. Two holes 12, 13 are placed in the first bar 10 so that they overlap with the pocket holes 7. While the hole 12 in the assembled state of the housing wall 1 leaves the entire opening of the corresponding pocket hole 7 free, opposing lengthwise edges of the hole form protruding teeth which partly cover the openings of the corresponding pocket holes 7.

Figure 2:
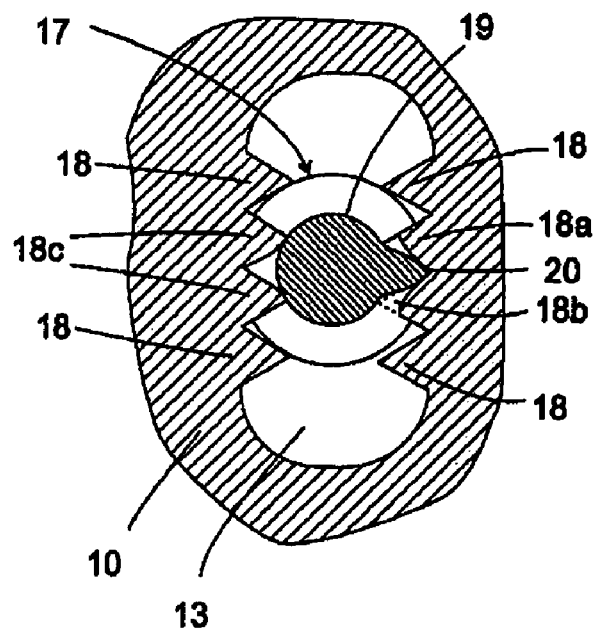
FIG. 2 a section through the support of the housing of FIG. 1 perpendicular to the longitudinal axis of the screw passing through it.
Figure 3:
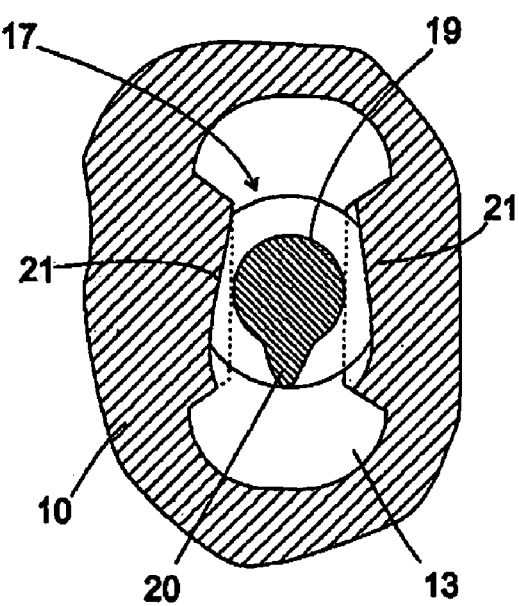
FIG. 3 a section similar to that shown in FIG. 2 as claimed in a modified embodiment of the invention.

The support rail 2 molded from a strong metal panel is provided with two slotted holes 14, 15 which, if the support rail 2 is resting on the housing wall 1, overlap with the holes 12, 13 of the bar 10. The holes 12, 13, 14, 15 are provided to enable a screw 15, 16 to be introduced through them into the pocket holes 7 of the inner part 3. The diameters of the pocket holes 7 are dimensioned so that, when tightened, the screws 16, 17 automatically cut a thread into the walls of the pocket holes 7 and anchor themselves by doing so. The dimensions of the holes 12, 14, 15 are selected so that the shafts of the screws 16, 17 can fit freely into them. The screw 16 which fits the holes 14, 12 thus merely holds the support pressed against the bar 10 if it is screwed into the pocket hole 7 until it stops, but does not inevitably establish a grounding contact between the support rail 2 and the metal outer part 8. FIG. 2 shows a cross-section through the bar 10 in the vicinity of the hole 13 provided with teeth 18 on its opposing longitudinal sides with a screw 17 passing through the hole 13. The cylindrical shaft 19 of the screw 17 can be seen, and protruding to the right of the shaft 19 in the perspective of the figure, the rib 20 forming the thread of the screw. This rib 20 fits between two adjacent teeth 18 and in doing so displaces the tip of one of the teeth, labelled 18a, downwards from the sectional plane and that of the second tooth, labelled 18b, upwards from the sectional plane. The tips of the teeth 18c on the longitudinal side of the hole 13 opposite the teeth 18a, 18b are compressed by the shaft 19 of the screw in a sideways direction. The inner contact between the teeth 18a, 18b, 18c and the rib 20 guarantees an electrically good conductive contact between the screw 17 and the outer part 8. If the screw 17 is tightened until it stops, so that its head presses from above against the support rail 2, a secure electrical contact between it and the support rail is also guaranteed, which conductively connects outer part 8 and support rail 2 to each other. Naturally the rib 20 cannot only fit the hole 13 between two teeth of the same longitudinal side, as shown in FIG. 2, but also between two teeth of opposite longitudinal sides. The effect is the same, one of the adjacent teeth 18 for the passage of the rib 20 through the sectional plane is forced upwards and one is forced downwards. The teeth 18 allow the torque required for screwing in the screw 17 to be kept small since the deformation by the screw 17 only affects the teeth, these can be deformed comparatively easily because of their freely protruding shape. If the material of the bar 10 is very thin and thereby inherently very easy to deform, to ensure sufficient contact pressure between the edges of the hole 13 and the screw 17 a shape of the hole as shown in FIG. 3 is also considered. Instead of individual teeth, a wide lug 21 protrudes here in each case from both longitudinal sides of the hole. When the screw 17 is screwed in one of the two lugs 21 is pushed upwards by the rib 20 of the screw from the sectional plane shown in the figure and the other is pushed downwards, and a secure electrical contact is guaranteed by the pressure of the lugs 21 on the rib 20 resulting from the deformation.

Since the screws 16, 17 are securely fixed in the self-tapping threads in the pocket holes 7 there is no danger of forces arising between the wall 1 and the support 2 of the screw 17 moving in the hole 13 and the electrical contact between the screw 17 and the outer part 8 being lost.

The invention claimed is:

1. A housing for an electric appliance, the housing comprising:
   a.) a wall having an electrically insulating solid structure and an electrically conductive skin that is fastened to the electrically insulating solid structure, the electrically insulating solid structure of the wall having at least one hole and the electrically conductive skin of the wall having a recess;
   b.) an electrically conductive support having a hole; and
   c.) at least one screw, the screw extending through the hole of the electrically conductive support and engaging the hole of the electrically insulating solid structure of the wall to resist movement of the electrically conductive support away from the wall, the screw extending through the recess of the electrically conductive skin of the wall and displacing material of the electrically conductive skin of the wall that surrounds the recess.

2. The housing as claimed in claim 1, wherein the recess of the electrically conductive skin of the wall is a hole.

3. The housing as claimed in claim 1, wherein the recess of the electrically conductive skin of the wall includes a serrated edge that is deformed by the screw.

4. The housing as claimed in claim 1, wherein the recess of the electrically conductive skin of the wall includes two serrated edge that are deformed by the screw and the two serrated edges of the recess lie opposite one another.

5. The housing as claimed in claim 1, wherein the electrically conductive skin is a metal panel forming an outer cover of the housing.

6. The housing as claimed in claim 1, wherein the electrically insulating solid structure of the wall is a molded part made of plastic.

7. The housing as claimed in claim 1, wherein a metal panel forming the electrically conductive skin has a layer of enamel thereon with an absence of the layer of enamel in the vicinity of the recess.

8. The housing as claimed in claim 1, wherein the housing is a refrigerator housing and the electrically conductive support is operable to support a compressor.

* * * * *